United States Patent
Dobronsky

(10) Patent No.: US 8,285,982 B2
(45) Date of Patent: Oct. 9, 2012

(54) SYSTEM AND METHOD FOR CUSTOMIZING ELECTRONIC MESSAGES

(75) Inventor: Oren Dobronsky, New York, NY (US)

(73) Assignee: Blinkx UK Limited, Cambridge, England (GB)

( * ) Notice: Subject to any disclaimer, the term of this patent is extended or adjusted under 35 U.S.C. 154(b) by 1291 days.

(21) Appl. No.: 11/614,430

(22) Filed: Dec. 21, 2006

(65) Prior Publication Data

US 2007/0162867 A1    Jul. 12, 2007

Related U.S. Application Data

(63) Continuation of application No. 10/420,625, filed on Apr. 22, 2003, now Pat. No. 7,159,192, which is a continuation of application No. 10/396,647, filed on Mar. 24, 2003, now abandoned, which is a continuation-in-part of application No. 09/864,551, filed on May 23, 2001, now Pat. No. 7,222,303, which is a continuation-in-part of application No. 09/373,815, filed on Aug. 13, 1999, now Pat. No. 6,784,900.

(51) Int. Cl.
    *G06F 21/00*    (2006.01)
(52) U.S. Cl. ......... 713/150; 380/232; 709/206; 715/752
(58) Field of Classification Search ................... 380/232; 713/150; 709/206; 715/751–759, 744, 779, 715/825
See application file for complete search history.

(56) References Cited

U.S. PATENT DOCUMENTS

| | | | |
|---|---|---|---|
| 5,786,815 A | 7/1998 | Ford | |
| 5,793,693 A | 8/1998 | Collins et al. | |
| 5,796,393 A | 8/1998 | MacNaughton et al. | |
| 5,818,446 A | 10/1998 | Bertram et al. | |
| 5,818,447 A | 10/1998 | Wolf et al. | |

(Continued)

FOREIGN PATENT DOCUMENTS

WO    WO 98/47080    10/1998

(Continued)

OTHER PUBLICATIONS

@Mail Webmail System ChangeLog (http://support.atmail.com/v3changelog.html; pp. 1-16; Oct. 2002).

(Continued)

*Primary Examiner* — Kim Vu
*Assistant Examiner* — John B King
(74) *Attorney, Agent, or Firm* — Rutan and Tucker, LLP

(57) ABSTRACT

A plug-in is provided to existing electronic message programs, such as electronic mail message programs, to provide a virtual toolbar therein. The virtual toolbar includes one or more virtual buttons that allow a user to select multimedia content to be added to an electronic message. The multimedia content may include, without limitation, any one or more of: graphics, audio, animation, video and text selections. The multimedia content may further include customizable templates in which business messages may be generated. The virtual buttons may be each be assigned to one category of related content, such as: Backgrounds for providing graphic backgrounds to a message, Holiday Themes for providing multimedia content associated with particular holidays, Animations for including FLASH animations or the like to a message, and Text for including pre-formatted text to a message. The content, appearance and number of virtual buttons may automatically be changed or updated by a content provider from time to time when the installed plug-in accesses a content server over a computer network, such as the Internet.

16 Claims, 11 Drawing Sheets

U.S. PATENT DOCUMENTS

| | | | |
|---|---|---|---|
| 5,850,548 | A | 12/1998 | Williams |
| 5,875,296 | A | 2/1999 | Shi et al. |
| 5,880,731 | A | 3/1999 | Liles et al. |
| 5,901,313 | A | 5/1999 | Wolf et al. |
| 5,923,885 | A | 7/1999 | Johnson et al. |
| 5,932,885 | A | 8/1999 | DeBellis et al. |
| 5,964,836 | A | 10/1999 | Rowe et al. |
| 5,986,654 | A | 11/1999 | Alexander et al. |
| 5,999,179 | A | 12/1999 | Kekic et al. |
| 5,999,973 | A | 12/1999 | Glitho et al. |
| 6,028,997 | A | 2/2000 | Leymann et al. |
| 6,034,681 | A | 3/2000 | Miller et al. |
| 6,041,360 | A | 3/2000 | Himmel et al. |
| 6,054,987 | A | 4/2000 | Richardson |
| 6,059,842 | A | 5/2000 | Dumarot et al. |
| 6,064,383 | A | 5/2000 | Skelly |
| 6,091,411 | A | 7/2000 | Straub et al. |
| 6,104,397 | A | 8/2000 | Ryan et al. |
| 6,121,967 | A | 9/2000 | Foster et al. |
| 6,133,915 | A | 10/2000 | Arcuri et al. |
| 6,141,010 | A | 10/2000 | Hoyle |
| 6,148,346 | A | 11/2000 | Hanson |
| 6,175,363 | B1 | 1/2001 | Williams et al. |
| 6,188,403 | B1 | 2/2001 | Sacerdoti et al. |
| 6,195,681 | B1 | 2/2001 | Appleman et al. |
| 6,195,691 | B1 | 2/2001 | Brown |
| 6,208,336 | B1 | 3/2001 | Carter |
| 6,232,972 | B1 | 5/2001 | Arcuri et al. |
| 6,266,058 | B1 | 7/2001 | Meyer |
| 6,288,753 | B1 | 9/2001 | DeNicola et al. |
| 6,292,185 | B1 | 9/2001 | Ko et al. |
| 6,295,058 | B1 | 9/2001 | Hsu et al. |
| 6,297,819 | B1 | 10/2001 | Furst |
| 6,304,898 | B1 | 10/2001 | Shiigi |
| 6,405,225 | B1 | 6/2002 | Apfel et al. |
| 6,496,203 | B1 | 12/2002 | Beaumont et al. |
| 6,522,333 | B1 | 2/2003 | Hatlelid et al. |
| 6,571,290 | B2 | 5/2003 | Selgas et al. |
| 6,651,087 | B1 | 11/2003 | Dennis |
| 6,747,970 | B1 | 6/2004 | Lamb et al. |
| 6,771,290 | B1 | 8/2004 | Hoyle |
| 6,784,900 | B1 | 8/2004 | Dobronsky et al. |
| 6,819,343 | B1 | 11/2004 | Sobeski et al. |
| 6,931,254 | B1 | 8/2005 | Egner et al. |
| 7,107,548 | B2 | 9/2006 | Shafron |
| 7,159,192 | B2 | 1/2007 | Dobronsky |
| 7,222,303 | B2 | 5/2007 | Oren et al. |
| 2001/0029527 | A1 | 10/2001 | Goshen |
| 2002/0140732 | A1 | 10/2002 | Tveskov |
| 2002/0149611 | A1 | 10/2002 | May |
| 2003/0107593 | A1 | 6/2003 | Domenico |
| 2003/0110450 | A1 | 6/2003 | Sakai |
| 2003/0206200 | A1 | 11/2003 | Hejl |
| 2003/0208543 | A1 | 11/2003 | Enete et al. |
| 2003/0225846 | A1 | 12/2003 | Heikes et al. |
| 2004/0003097 | A1 | 1/2004 | Willis et al. |
| 2004/0041836 | A1 | 3/2004 | Zaner et al. |
| 2004/0215721 | A1 | 10/2004 | Szeto et al. |
| 2004/0221224 | A1 | 11/2004 | Blattner et al. |
| 2004/0268263 | A1 | 12/2004 | Van Dok et al. |
| 2007/0245246 | A1 | 10/2007 | Oren et al. |

FOREIGN PATENT DOCUMENTS

| | | |
|---|---|---|
| WO | WO 0025239 | 5/2000 |
| WO | WO 01/97121 | 12/2001 |
| WO | WO 0208852 | 1/2002 |
| WO | WO 0232032 | 4/2002 |

OTHER PUBLICATIONS

CNET Download.com (http://www.download.com; Plugins; pp. 1-4), 2005.
Cluts, Nancy W., "The Rebar Control: Using a Coolbar in Your Application," Microsoft Corporation, (Oct. 1, 1996), 10 pp.
Esposito, Dino, "Browser Helper Objects: The Browser the Way You Want It," Microsoft Corporation, (Jan. 1, 1999), 10 pp.
Gulesian, Marcia, "Plugging Into the Web," DBMS, (Dec. 1, 1996), 6 pp.
Roberts, Scott, "Take Total Control of Internet Explorer with Advanced Hosting Interfaces," MSDN, (Oct. 1, 1998), 8 pp.
Smith, Douglas, WindowBlinds Preview 0.40; Change Desktops as Easily as You Change Clothes, WinPlanet, (Feb. 8, 2002), 2 pp.
Smith, Douglas, "WindowBlinds Preview 0.40; What Are These WindowBlind Things Anyway?," WinPlanet, (Feb. 8, 2002), 2 pp.
Keizer, Gregg, "Put a Little Yahoo in Your Browser—Plug-in puts Yahoo content on your browser's toolbar," Feb. 8, 2001, PCWorld. com, Web Services, 1 page, http://www.pcworld.com/resource/printable/article/0,aid,15179,00.asp, [last accessed Sep. 9, 2004].
Internet ScreenDump (Yahoo!Companion, pp. 6). May 14, 2001.
Internet Article (Let Yahoo! Companion Be Your Guide; Users Can Now Customize Browser Toolbar to Feature Yahoo! Bookmarks and Services; Business Wire, Jun. 29, 1999; pp. 2).
Stardock Press Release (Stardock Announces WindowBlinds, version 0.80, Mar. 24, 1999), 2 pages.
WindowBlinds 0.95 Preview, ActiveWindows. 2 pages, wysiwyg://154/http://www.activewin.com/reviews/wb/95pre/wb95.shtml, [last accessed Feb. 8, 2002].
Leebow's Friday Letter (http://scout118.cs.wisc.edu/netnews/Jun. 4, 1999/0010.html), 3 pages.
Yahoo!Companion [http ://www.32bit .com/software/listings/Internet/Plugin/ S/10416]; Printed May 14, 2001, 2 pages.
Winamp Skins, Sep. 26, 1998, 9 pages.
Keller, Richard M., et al., "A Bookmarking Service for Organizing and Sharing URLs", Elsevier Science B.V, May 14, 1998, 12 pp.
NeoPlanet Home Page, © 1998-2004 NeoPlanet, Inc., 1 page, http://www.neoplanet.com. [last accessed Dec. 27, 2006].
Alexa Homepage and Associated Webpages. http://www.archive.org. Available Dec. 2000 or earlier. Printed Dec. 2006. 23 pages.
Adam Wisniewski, What, me worry? Despite hard financial times, Web innovations could still be found at Internet World 2000; TimeOut Technology, Nov. 9-16, 2000 Issue No. 268; 1-2 pages.
Chris Gonsalves, Hardware news, software updates & services briefs, ZDNet eWEEK Building The E-Business Enterprise, Nov. 13, 2000, 1 thru 4 pages.
CHtmlView, MSDN Oct. 2000, 2 pages.
CSkin, MFC Visual C++6.0, Published prior to applicant's file date, 7 pages.
"NeoPlanet steps up support of mozilla.org open source software development", Apr. 18, 1999, 00 :NeoPlanet press, 2 pages.
Chappel D; Linthicum D S: "ActiveX demystified", BYTE (International Edition), Sep. 1997, ISSN 0360-5280, vol. 22, No. 9, pp. 56-62, 64, (XP000726365).
TipWorld: "Tips Internet Explorer: Nov. 1996", p. 1-6, published on Internet, available via site http://www.cc1.jura.uni-sb.de.
TipWorld: "Tips Internet Explorer: Apr. 1998", p. 1-9, published on Internet, available via site http://www.cc1.jura.uni-sb.de.
Tim Daniels: "1001 Secrets for Windows NT Registry", Dec. 1997, USA, Internet version, available via Internet at http://www.windowsitlibrary.com. pp. 1-4.
Miah T; Karageorgou M.; Knott R P: "Adaptive Toolbars: An Architectural Overview", 3rd ERCIM Workshop on "User Interfaces for All", Obernai, France, Nov. 3-4, 1997, (XP002165773), 7 pages.
European Office Action, European Patent Office, Application No. 0944199.9, mail date Jul. 29, 2002, 3 pages.
European Office Action, European Patent Office, Application No. 0944199.9, mail date Apr. 25, 2003, 2 pages.
European Office Action, European Patent Office, Application No. 0944199.9, mail date Feb. 7, 2005, 8 pages.
European Office Action, European Patent Office, Application No. 0944199.9, mail date Feb. 8, 2006, 9 pages.
International Search Report, International Patent Application No. PCT/US03/37063, dated Mar. 25, 2004, 1 page.
International Preliminary Examination Report, International Patent Application No. PCT/IL00/00416, dated Sep. 26, 2001, 7 pages.
International Written Opinion, International Patent Application No. PCT/IL00/00416, dated Jul. 11, 2001, 7 pages.
International Search Report, International Patent Application No. PCT/IL00/00416, dated Nov. 15, 2000, 4 pages.
Non-Final Office Action for U.S. Appl. No. 09/373,815 mailed Feb. 13, 2012, 9 pages.

Non-Final Office Action for U.S. Appl. No. 09/373,815 mailed Nov. 7, 2002, 8 pages.
Final Office Action for U.S. Appl. No. 09/373,815 mailed Apr. 21, 2003, 10 pages.
Non-Final Office Action for U.S. Appl. No. 09/373,815 mailed Jan. 9, 2004, 6 pages.
Non-Final Office Action for U.S. Appl. No. 09/864,551 mailed Mar. 1, 2004, 7 pages.
Final Office Action for U.S. Appl. No. 09/864,551 mailed Sep. 10, 2004, 9 pages.
Non-Final Office Action for U.S. Appl. No. 09/864,551 mailed Jun. 28, 2005, 9 pages.
Non-Final Office Action for U.S. Appl. No. 09/864,551 mailed Dec. 27, 2005, 9 pages.
Final Office Action for U.S. Appl. No. 09/864,551 mailed Jul. 26, 2006, 8 pages.
Non-Final Office Action for U.S. Appl. No. 11/736,824 mailed Sep. 8, 2011, 10 pages.
Notice of Allowance for U.S. Appl. No. 11/736,824 mailed Apr. 23, 2012, 6 pages.
Non-Final Office Action for U.S. Appl. No. 10/420,625 mailed Oct. 21, 2004, 11 pages.
Final Office Action for U.S. Appl. No. 10/420,625 mailed May 4, 2005, 10 pages.
Non-Final Office Action for U.S. Appl. No. 10/420,625 mailed Sep. 21, 2005, 11 pages.

SYSTEM AND METHOD FOR CUSTOMIZING ELECTRONIC MESSAGES

CROSS-REFERENCE TO RELATED APPLICATIONS

This application is a continuation of U.S. patent application Ser. No. 10/420,625, entitled SYSTEM AND METHOD FOR CUSTOMIZING ELECTRONIC MESSAGES filed in the name of Oren Dobronsky on Apr. 22, 2003, now U.S. Pat. No. 7,159,192 which is a continuation of U.S. patent application Ser. No. 10/396,647, entitled SYSTEM AND METHOD FOR CUSTOMIZING ELECTRONIC MESSAGES, filed in the name of Oren Dobronsky on Mar. 24, 2003 (abandoned), which is a continuation-in-part of U.S. patent application Ser. No. 09/864,551 entitled SYSTEM AND METHOD FOR THE DYNAMIC IMPROVEMENT OF INTERNET BROWSER NAVIGABILITY filed in the name of Dobronksy et al. on May 23, 2001, now U.S. Pat. No. 7,222,303 which is a continuation in part of U.S. patent application Ser. No. 09/373,815 entitled SYSTEM AND METHOD FOR THE DYNAMIC IMPROVEMENT OF INTERNET BROWSER APPEARANCE AND CONNECTIVITY filed in the name of Dobronsky et al. on Aug. 13, 1999, now U.S. Pat. No. 6,784,900, issued on Aug. 31, 2004, each of which is incorporated herein by reference.

FIELD OF THE INVENTION

The present invention relates generally to electronic computers and digital processing systems for multiple computer or process coordinating, and relates more particularly to demand based messaging.

BACKGROUND OF THE INVENTION

Electronic message programs are widely used around the world to send electronic messages over a computer network between two or more users having computer terminals at separate locations. Such electronic message programs include electronic mail (e-mail) programs and instant messaging programs. Common existing e-mail programs include Outlook® and Outlook Express® developed by Microsoft Corp.®, or LotusNotes® developed by IBM Corporation®, which are collectively used by tens of millions of computer users worldwide.

At present, electronic messages largely have plain, static backgrounds over which text is inserted. Some existing electronic messaging programs do provide limited functionality to modify the backgrounds of electronic messages. For example, a system for embedding backgrounds into electronic messages is disclosed in PCT Publication No. WO 02/08852 filed in the name of INCREDIMAIL. Some electronic message program developers also currently provide their software upgrades for including additional backgrounds to their program's existing options. However, such developer-provided content is typically limited in the number of available choices for content, is not customizable to a particular user, requires that the content be stored locally on a user's terminal, and/or requires the download and use of a program instead of common e-mail programs.

Accordingly, there is a need for a method and apparatus for customizing electronic messages that addresses certain shortcomings in existing technologies.

SUMMARY OF THE INVENTION

Here are disclosed various systems and methods for customizing electronic messages wherein a user may upload and install executable code for providing a virtual toolbar within an existing electronic message program. In certain embodiments, the executable code may be provided as a plug-in to the electronic message program. After installing the executable code, the user is presented with the virtual toolbar when the electronic message program, or a new electronic message within the program, is opened. The virtual toolbar may be disposed separately from a native toolbar of the electronic message program. In certain embodiments, the virtual toolbar may be disposed between a native toolbar and a message input window of the electronic message program. The virtual toolbar may include a plurality of virtual buttons for selecting different content, or categories of content, that can be included within an electronic message.

Upon selecting a virtual button, a separate window may be displayed to the user that includes a plurality of selectable content associated with the virtual button. The window may additionally include listings of one or more subcategories of associated content. Available content may include holiday-themed content, visual images such as artwork and photography, animations, audio content, audio/visual content, and business-formatted content. Sub-categories may include any generic group of content, such, as animal scenes, nature scenes, world landmarks, and so forth.

The selectable content may be stored locally on a central content server and may therefore be updated without having to update a plurality of plug-ins stored on a plurality of users' computer terminals. In certain embodiments, the content may not be permanently stored on a user's computer terminal at all. Instead, the virtual buttons provided by the plug-in may contain a link to a page stored on the central content server. Accordingly, only the page need be updated to update available content. The central content server may also change attributes of the virtual toolbar or the virtual buttons whenever the plug-in is activated and accesses the central content server over a computer network.

The user may select particular content from the displayed list or lists for inclusion in an electronic message, and may also input text to the message in a standard manner. A user may select content as default content for inclusion in future electronic messages, if the user desires. In such case, the selection of default content may be stored locally at the user's computer terminal or at the central content server, or a combination of both.

When an electronic message with selected or default content is transmitted to another user, the message may simply contain any user-inputted text and a call to a network address location of the content on the central content server, rather than a data file containing the content itself in order to conserve the data size of the electronic message. When the second user opens a received electronic message with the call, the content is generally transmitted from the central content server for display when the received electronic message is opened or may also be embedded in the e-mail transmitted. The second user is not required to have the plug-in to receive or view the content selected by the first user.

BRIEF DESCRIPTION OF THE DRAWINGS

Further aspects of the present disclosure will be more readily appreciated upon review of the detailed description of the preferred embodiments, included below, when taken in conjunction with the accompanying drawings, of which:

FIG. 4 is an illustration of a prior art main window of an exemplary electronic message program, which may be displayed on the user terminal of FIG. 1 prior to installation of the plug-in;

FIG. 5 is an illustration of a prior art electronic message window of an exemplary electronic message program, which may be displayed on the user terminal of FIG. 1 prior to installation of the plug-in;

DETAILED DESCRIPTION OF THE INVENTION

Referring now to FIGS. 1-12, wherein similar components of the present invention are referenced in like manner, preferred embodiments of a method and system for customizing electronic messages are disclosed.

Figure 1:
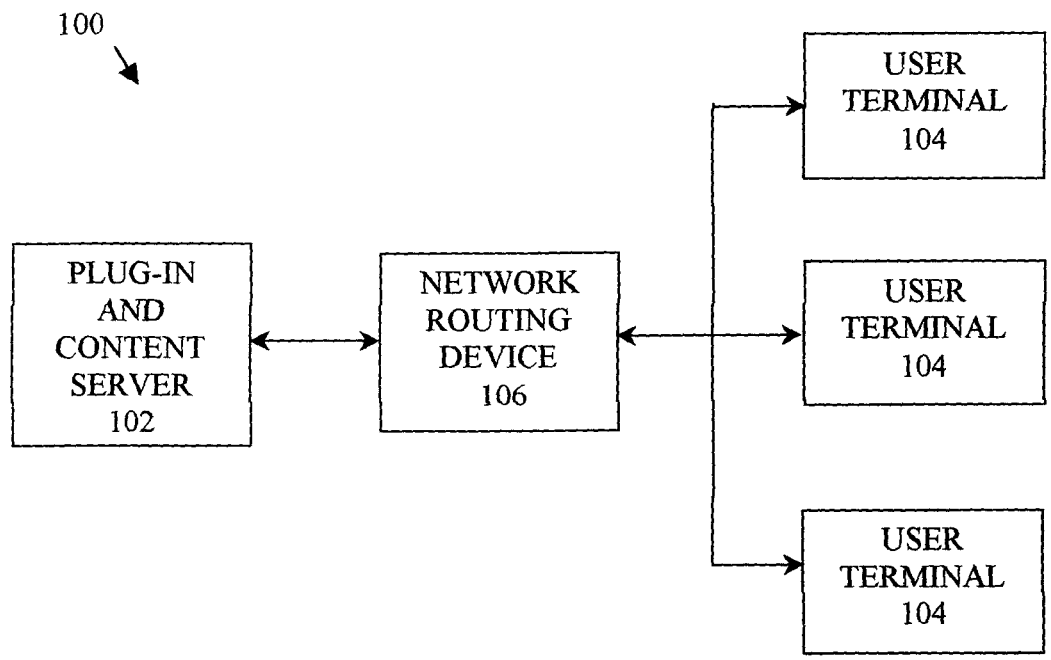
FIG. 1 is a schematic diagram of an exemplary computer network.

Turning now to FIG. 1, there is depicted an exemplary network 100 over which certain embodiments of the present disclosure may be practiced. The network 100 may be any known computer, electronic, optical, telecommunications, wireless or satellite network, or any combination of these elements, useful for accomplishing data transmissions between, for example, two users at separate computer terminals. In certain embodiments, the network 100 may be a local-area computer network or wide-area computer network, a corporate Intranet, a public computer network such as the Internet or World-Wide Web, any other comparable computer networks, or any combination of the same.

In those embodiments involving multiple users in electronic communication over a commonly-accessible computer network, the network 100 may include a plurality of user terminals 104 in two-way communication with each other and with a central Plug-In and Content Server 102 (sometimes referred to herein as "content server 102"), via at least one network routing device 106. In such embodiments, the plurality of user terminals 104 may be any one or more known computing devices, such as a personal computer or workstation equipped with a modem or other similar network communication device, as are commonly manufactured by, for example, Dell Corporation® or Gateway Corporation®. The network routing device 106 may accordingly be any one or more of the following devices: a computer server dedicated to routing communications data over a computer network, such as computer servers commonly manufactured by IBM Corporation®; and a computer network routing device or Internet router, such as those commonly manufactured by Cisco Corporation®. The Plug-in and Content Server 102 may, in such embodiments, be one or more computer servers operated by a content provider or group of content providers. The computer server(s) is/are operable, via appropriate hardware and programming, to store and communicate both: (1) executable programming code or processing instructions for installing an access to content within an existing electronic message program on a user terminal 104 and (2) content to be accessed by the user after installation of the executable programmable code. Further descriptions of an exemplary Plug-In and Content Server 102 are provided later below in conjunction with FIG. 2.

In those embodiments where the network 100 is the Internet, each of the plurality of user terminals 104 and the Plug-In and Content Server 102 may have a unique network address, such as an Internet Protocol (IP) address. A user terminal 104 may be operable to communicate calls for content from an IP address of the Plug-In and Content Server 102. The Plug-In and Content Server 102 may be operable to store the IP address or, store or generate any other type of unique identifier, corresponding to a particular user terminal 104 that has accessed and installed the executable programming code. The Plug-In and Content Server 102 may store such a unique identifier in order to, for example, associate and store any configurations or preferences for content selected by the user, as described later below.

In alternate embodiments where network 100 is not a computer network, each of the Plug-In and Content Server 102, the plurality of user terminals 104 and the network routing device 106 may be substituted with similar devices that perform similar functions in the subject network environment. For example, in a cellular telephone communications network, the plurality of user terminals 104 may be cellular telephones, content server 102 may be a server maintained by a cellular telephone communication provider, and network routing device 106 may be a wireless antenna that routes cellular communications there-between. In another example where network 100 is a satellite network, each of Plug-In and Content Server 102 and the plurality of user terminals 104 may be computers and servers as described previously, and network routing device 106 may be a satellite transmitter/receiver. Likewise, in an optical network environment, the network routing device 106 may be one or more optical communication routers. Additional examples involving alternate network embodiments will be apparent to those of ordinary skill in the art, and are readily contemplated as being within the scope of the present disclosure.

Figure 2:
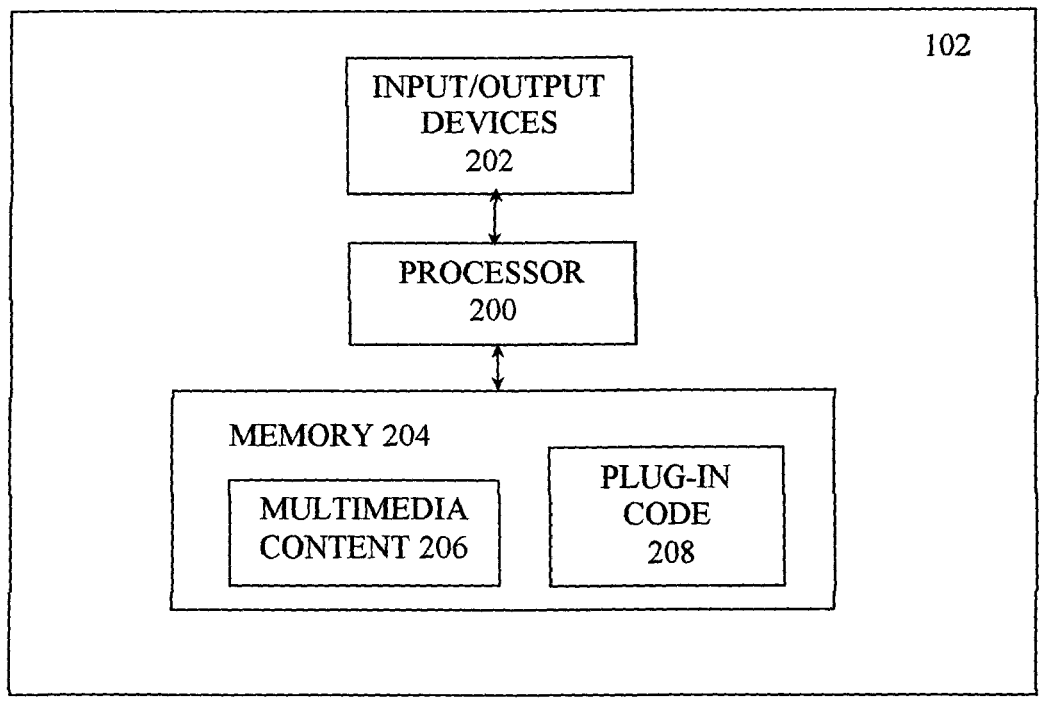
FIG. 2 is a schematic diagram of the plug-in and content server of FIG. 1, according to certain embodiments of the present disclosure.

Referring now to FIG. 2, there are depicted exemplary components of a Plug-In and Content Server 102. The content server 102 may include a processor 200, such as those commonly manufactured by Intel Corporation® or Sun Microsystems Inc.®, for executing machine-readable programming code, commands or processing instructions as described herein. Content server 102 may further include one or more input/output devices 202, which may be any known devices used for communicating over the network 100, such as a modem or similar computer communication device. The input/output devices 102 may also be any known device used for inputting programming commands from an operator of the content server 102, such as a keyboard, a computer mouse, or a speech-recognition device. The input/output devices 102 may further be any known device for displaying data to an operator of content server 102, such as a computer display.

The memory 204 may be any known device (1) for storing content data, such as multimedia content 206, and (2) for storing programming code, commands or processing instructions that are executable by the processor 200, such as plug-in code 208. Accordingly, memory 204 may be any one or more of the following: a random-access memory (RAM); a read-only memory (ROM); a Metal-Oxide Semiconductor (MOS)-based storage device such as a memory chip or a hard drive; a portable computer-readable medium, such as a floppy disk, a Compact Disc-Read Only Memory (CD-ROM), a Digital Video Disc-Read Only Memory (DVD-ROM); or any other known write-once or re-writable computer-readable medium or combination thereof.

Multimedia content 206 stored by memory 204 may include data files that store content, which can be selected and inserted into an electronic message by a user. The content may be any of a variety of multimedia content readily available to current computer users, including: graphical images, scanned images, photographs, pre-formatted text, animations, audio content, audio/visual content and any combination or element thereof. Graphical images may be provided in various data formats, such as, but not limited to: .GIF, .TIF, .BMP, and .JPG Animations may be provided in FLASH programming code or other similar formats. Audio content may be provided in, for example, .WAV or .MP3 formats. Audio/visual content may be of the type commonly available in .MPEG or similarly-functioning formats. The available content may be determined by a content provider maintaining the content server 102, or may alternatively include, separately or in addition thereto, content that is downloaded to the content server 102 by a user or stored locally by a user.

In certain embodiments, the plug-in code 208 stored by memory 204 provides a plug-in to an existing electronic message program on the user terminal 104. Since there are various existing electronic message programs that are already in vast world-wide use, the systems and methods disclosed herein have a greater potential to be widely adopted by users of such existing electronic message programs if a plug-in to such existing programs is provided, rather than attempting to introduce to the global market place a completely new electronic message program incorporating the systems and methods herein. The plug-in is additionally of a smaller size and thus more readily transmitted and installed than would be a completely new electronic message program.

It should be readily appreciated that content server 102 may be a single computer server, or may be any number of locally- or geographically-disperse servers that cooperate to perform the functions described herein. The executable code and data described here as stored by the content server 102 may be stored in any manner among a cooperating group of content servers 102, and may or may not be stored in the same memory 204 as depicted in FIG. 2. It should be further appreciated that the content server 102 may, in certain embodiments, be operated by a content-providing business entity, an agent of such a content provider, or any other operator who maintains the systems and performs the methods described in the present disclosure.

It should likewise be readily appreciated that the user terminals 104 mentioned previously may contain similar hardware components that were described above with respect to the content server 102.

Figure 3:
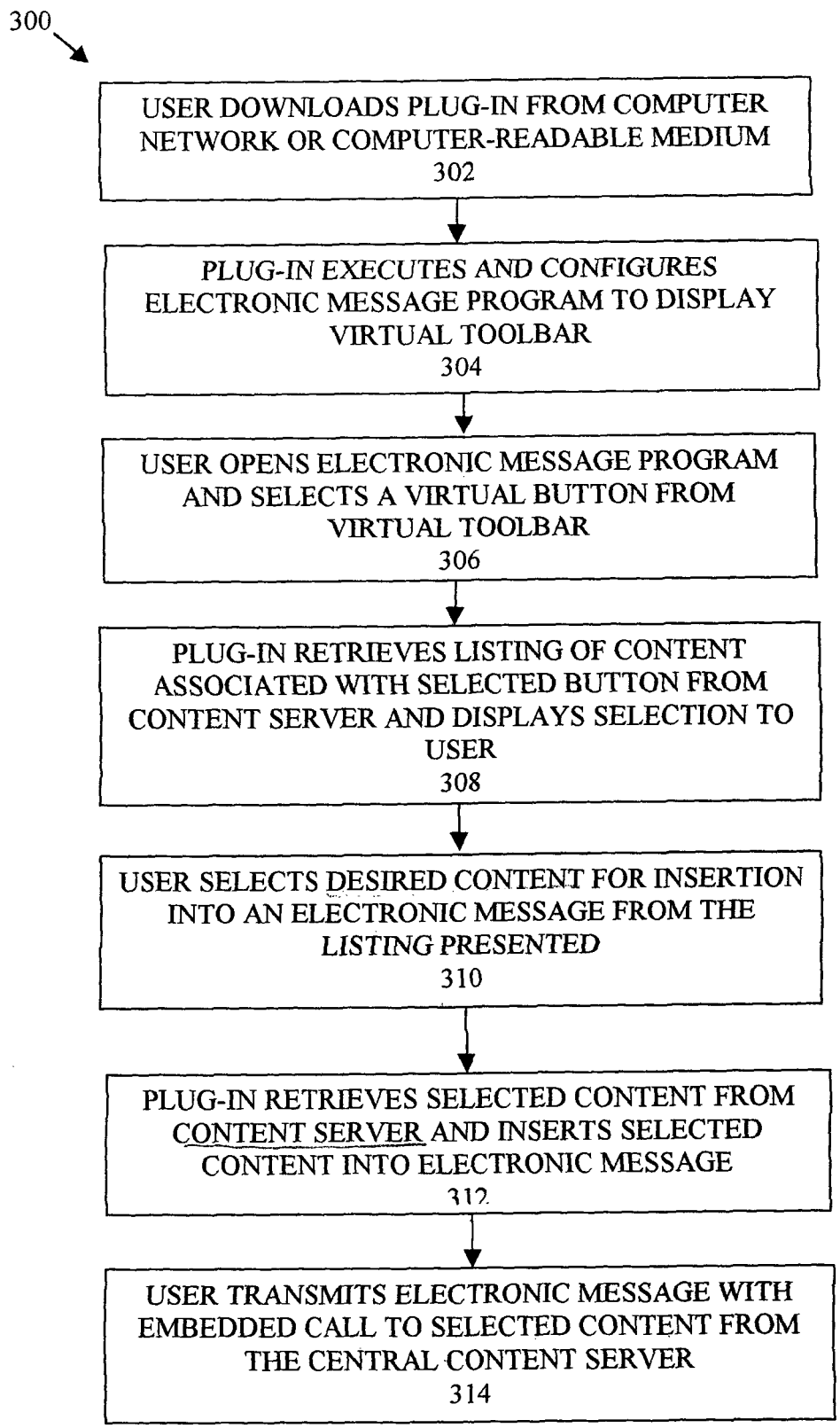
FIG. 3 is a flowchart depicting a process for creating customized electronic mail messages using the plug-in, according to certain embodiments of the present disclosure.
Figure 4:
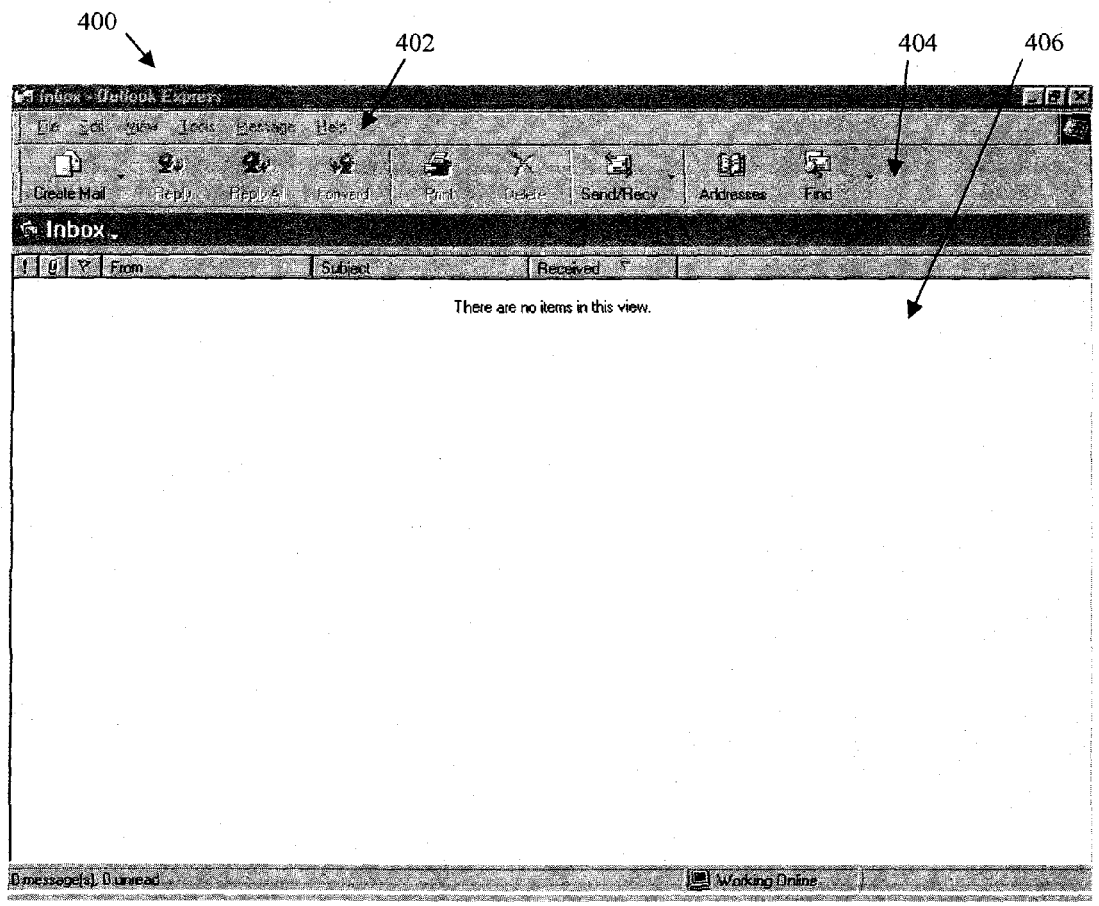

Turning now to FIG. 3, in conjunction with particular references to FIGS. 4-11, there is depicted an exemplary process 300 for customizing an electronic message according to certain embodiments of the present disclosure. In the context of a computing network 100 as described with respect to FIGS. 1 and 2, the process 300 commences when a user operating a user terminal 104 accesses and downloads the plug-in code 208 from Plug-In and Content Server 102 (step 302). For example, the plug-in code 208 may be retrieved from a publicly accessible IP network address (i.e. a web page on a web site) over the Internet. The download of the plug-in code 208 may be requested by a user or may be automatically transmitted to a user terminal 104 upon its accessing of the content server 102.

Next, the downloaded plug-in code 208 is installed on the user terminal 104 (step 304). It may then be executed by a user, or may be provided with automatically-executing processing instructions, to reconfigure an existing electronic message program on the user terminal 104. In particular, the electronic message program may be reconfigured to display a new virtual toolbar 600 therein.

A comparison of in FIGS. 4 and 5 to FIGS. 6 and 9, respectively, will provide one example of how an electronic message program may be reconfigured by the plug-in code 208 according to step 304. A main window 400 of an existing message program of the prior art is displayed in FIG. 4. Prior to any installation of the plug-in code, the main window 400 may contain: a native menu bar 402 for accessing menus of native programming commands relating to the electronic message program; a native toolbar 404 for selecting native functions of the electronic message program; and a message pane 406 for listing, inter alia, any received electronic messages.

Figure 5:
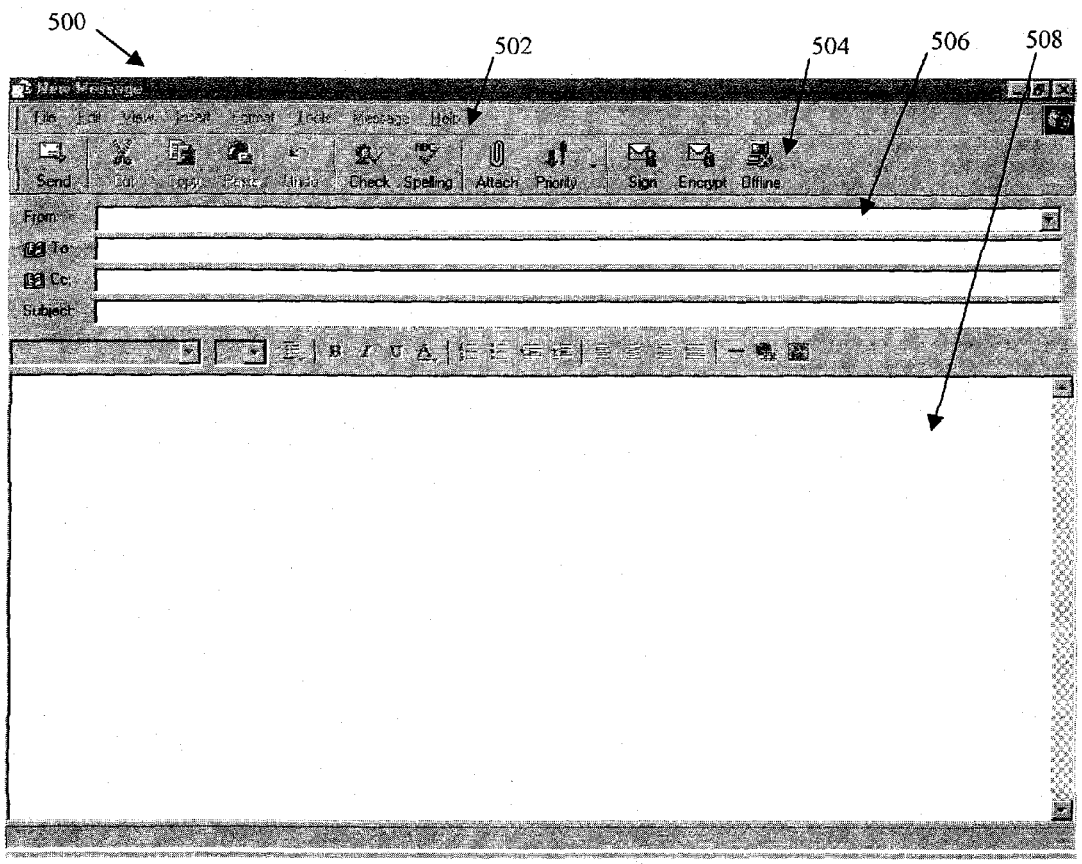

When a user creates a new message using the existing electronic message program, a new electronic message window 500 is generated, an example of which is displayed in FIG. 5. Prior to installation of the plug-in code 208, the electronic message window 500 may contain: a native menu bar 502, a native toolbar 504, a number of message recipient address and message subject fields 506, and a message input field 508.

Figure 6:
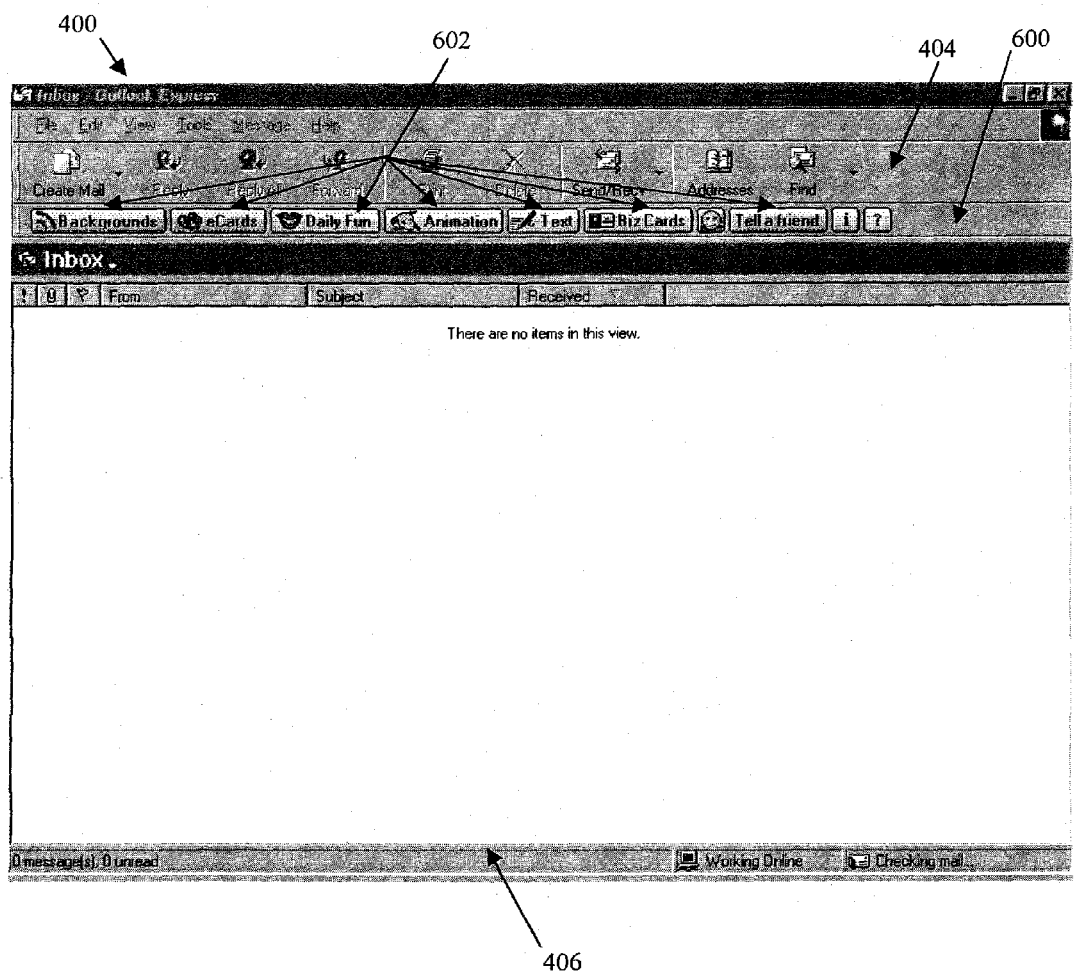
FIG. 6 is an illustration of a main window of an electronic message program including an exemplary virtual toolbar for inserting content into an electronic message, which toolbar may be displayed on the user terminal of FIG. 1 after installation of the plug-in, according to certain embodiments of the present disclosure.
Figure 7:
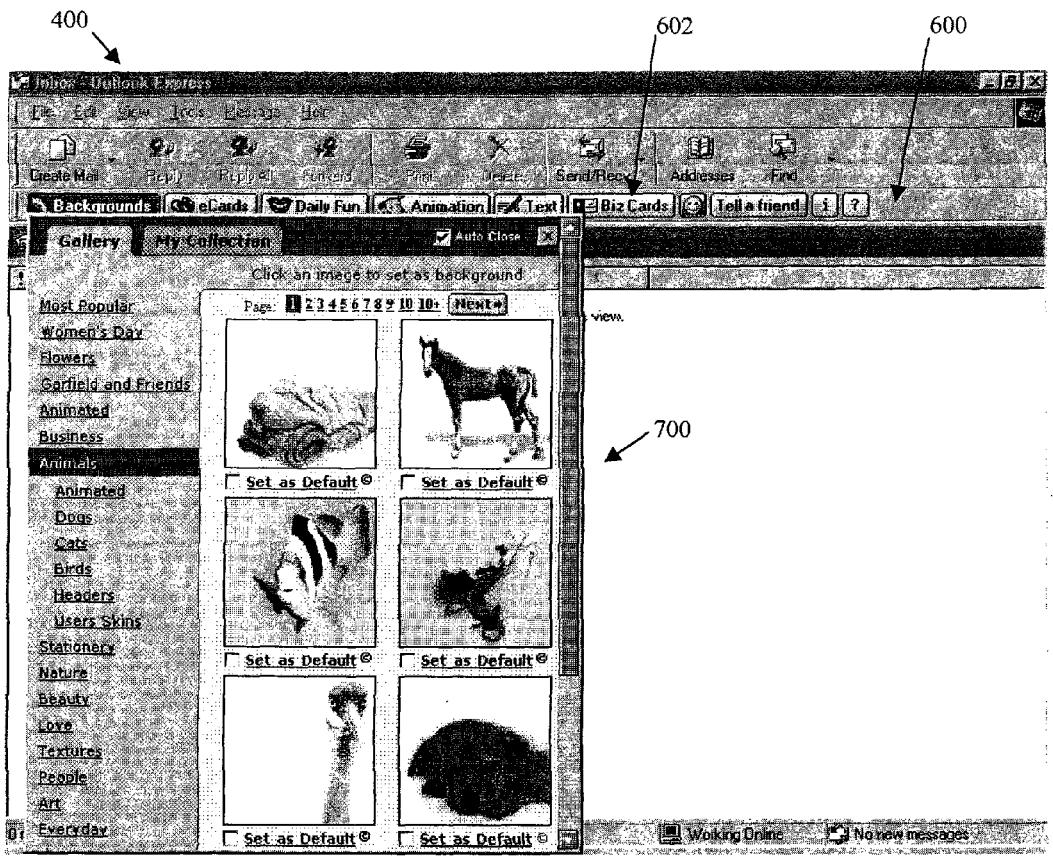
FIG. 7 is an illustration of a first exemplary content window displaying available content and sub-categories of content associated with a virtual button of the virtual toolbar of FIG. 6, according to certain embodiments of the present disclosure.
Figure 8:
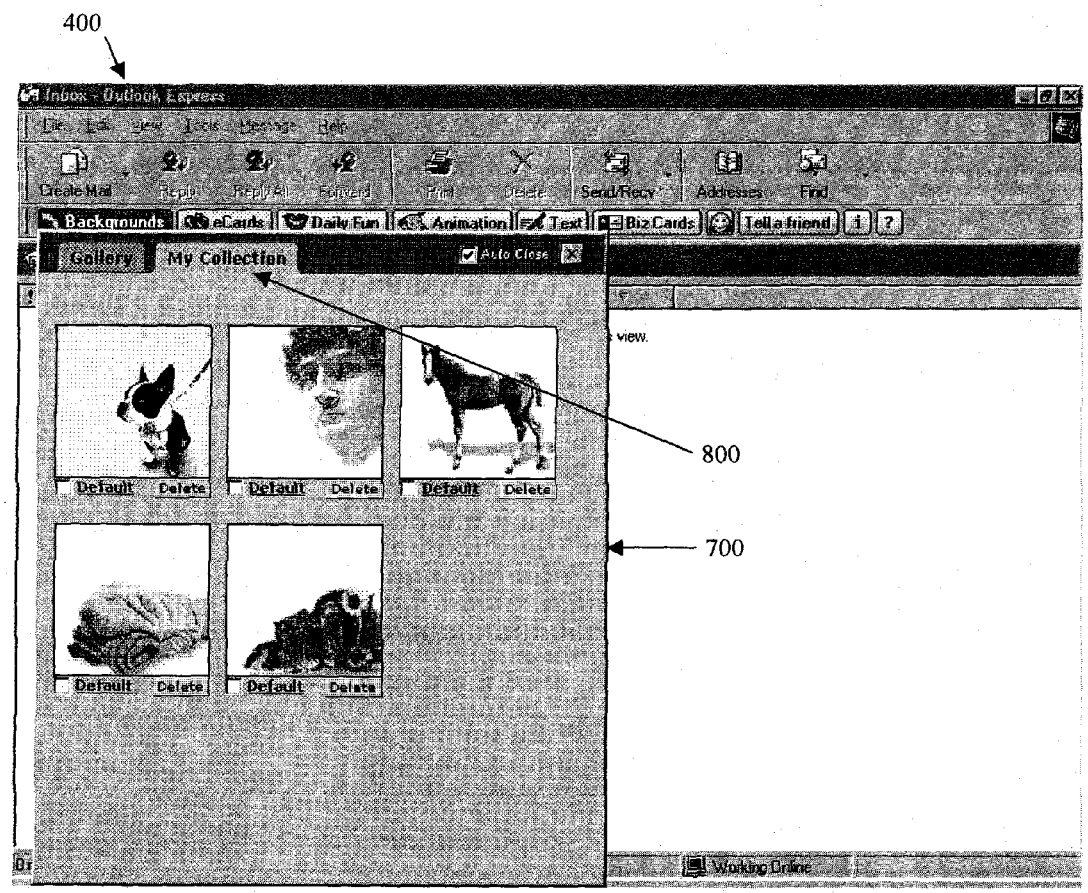
FIG. 8 is an illustration of a second exemplary content window displaying available content, according to certain embodiments of the present disclosure.

After installation of the plug-in code 208, the main window 400 and the electronic message window 500 may be reconfigured by the plug-in code 208, as displayed in FIGS. 6 and 7 respectively. As shown in FIG. 6, the main window 400 has been re-configured to include a virtual toolbar 600 containing one or more virtual buttons 602, wherein when a user selects a virtual button 602, a window is presented that shows associated selectable content that is available for insertion into an electronic message.

In certain embodiments, the virtual toolbar 600 may be disposed between the native toolbar 404 and the message pane 406. The insertion of the virtual toolbar 600 at this location in the main window 400 provides a convenient and readily-accessible place for a user to select and access available content. In further embodiments, the toolbar 600 may be provided in alternate useful locations within the main window 400, or even outside the main window 400 on a user terminal's display. Nothing in FIG. 6 should be considered to limit the shape, appearance, configuration or the like of the virtual toolbar 600 or the virtual buttons 602 themselves (including the number or any attributes of the virtual buttons 602), or the particular attributes of the main window 400.

Figure 9:
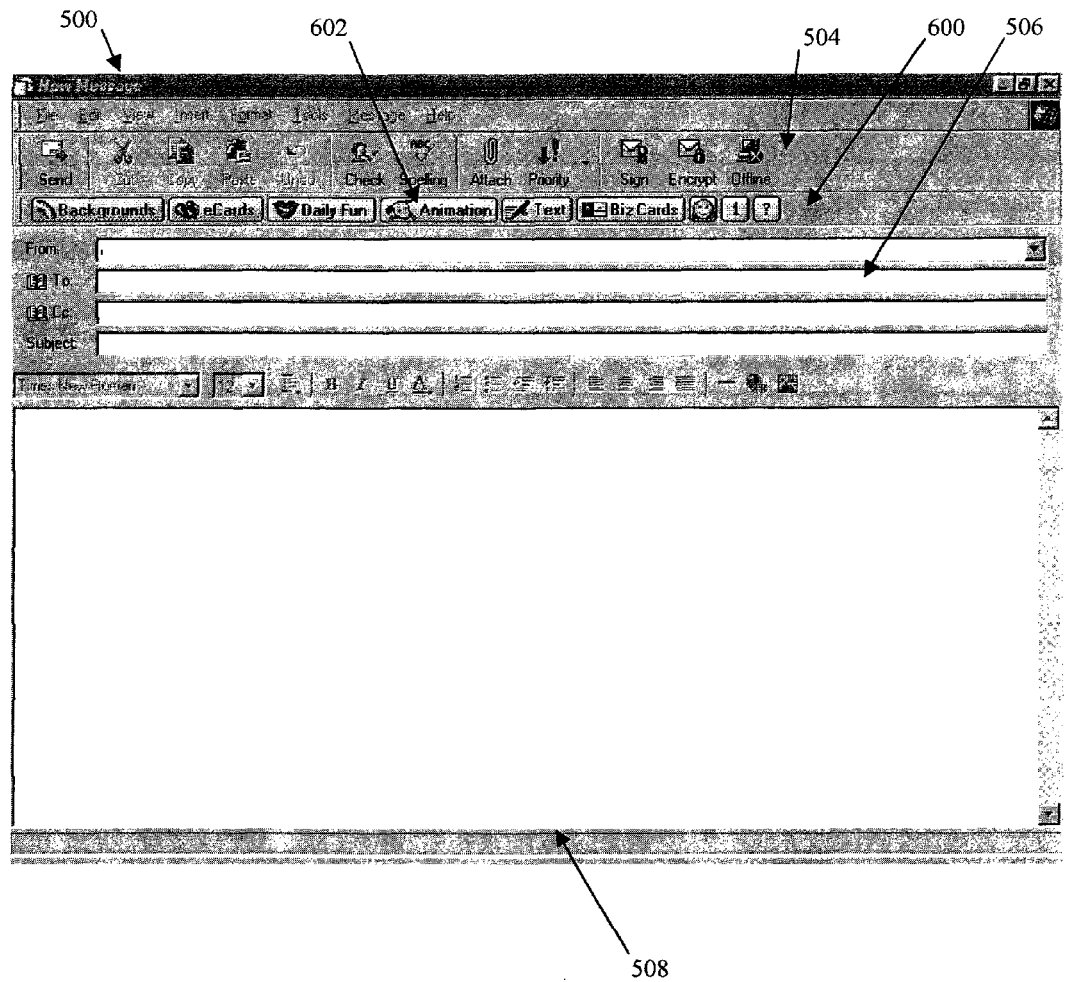
FIG. 9 is an illustration of a message window of an electronic message program including an exemplary virtual toolbar for inserting content into an electronic message, which may be displayed on the user terminal of FIG. 1 after installation of the plug-in according to certain embodiments of the present disclosure.

The electronic message window 500 may be similarly reconfigured as described above with respect to FIG. 6. One example of the results of such reconfiguration is shown in FIG. 9, wherein the virtual toolbar 600 is displayed to a user. In certain embodiments, the virtual toolbar 600 may be disposed between the native toolbar 504 and the message input field 508. The virtual toolbar 600 may also be disposed between the native toolbar 504 and the message recipient address and message subject fields 506. The insertion of the virtual toolbar 600 at such locations in the electronic message window 500 provides a convenient and readily-accessible place for a user to select and access available content.

In further embodiments, the virtual toolbar 600 may be provided in alternate useful locations within the electronic message window 500, or outside the electronic message window 500 on a user terminal's display. Nothing in FIG. 9 should be considered to limit the shape, appearance, configuration or the like of the virtual toolbar 600 or the virtual buttons 602 themselves (including the number or any attributes of the virtual buttons 602), or the particular attributes of the electronic message window 500.

The manner in which such reconfigurations of the main window 400 and the electronic message window 500 are achieved is largely dependent on the existing electronic message programs being used by a user terminal 104. For example, where the existing electronic message program is any of the various versions of Microsoft® Outlook®, such reconfiguration may be accomplished in accordance with the _IDTExtensibility2 interface implementation published by Microsoft®. A Common Object Module (COM) object is registered by the plug-in code 208 with the Outlook® program. The COM object generates a call including a bootstrap parameter that enables recognition by the Outlook® program for certain plug-in code relating to the attributes and location of the virtual toolbar 600.

Where the existing electronic message program is any of the various versions of Microsoft® Outlook Express®, such reconfiguration may be accomplished in a slightly different manner, since Outlook Express® does not readily provide for add-on programming, particularly third-party add-ons by a different manufacturer. In this case, a standard announced by Microsoft® called hooking may be employed. The standard includes programming "hooks" that allows detection of window events and process crossings initiated by the electronic message program and further allows redirecting native commands to new code. When a new window-creating event for the Outlook Express® program is detected by the plug-in code 208, a bootstrapping of the new code corresponding to the virtual toolbar 600 and virtual buttons 602 is inserted into the event for providing the virtual toolbar 600 and virtual buttons 602 within the main window 400 and the message window message 500. Such bootstrapping may be accomplished using known sub-classing techniques for planting new code in the electronic message program as described above.

Similar techniques can be employed for other existing electronic mail messaging programs, such as LotusNotes® by IBM Corporation®. Use of such similar techniques will be largely dependent on the methods of interacting with native programming instructions provided by such programs' manufacturers.

Returning to process 300, after step 304 above, the user may open or initiate the electronic message program, which now includes the virtual toolbar 600, and selects a virtual button 602 from the virtual toolbar 600 that corresponds to particular content, or categories of content, for insertion into an electronic message (step 306). The virtual buttons may include a brief description of a category of content associated with the virtual button 602. Such title on the virtual button may be changed from time to time by the content server 102, and in certain embodiments, without initiation of any commands by the user. Such selection may be performed by a user on user terminal 104 by placing a display cursor over the virtual button 602 and depressing a key on a computer mouse. Upon selection of the virtual button 602, the installed plug-in retrieves a listing of content associated with selected button from content server 102 and displays the available selections to the user (step 308). The displayed listing(s) may be retrieved by the installed plug-in by accessing a web page or the like of the content server 102 over the computer network 100. The web page may contain hypertext links or the like to network address of data files containing the selected content for display to the user in a generated electronic message.

In certain embodiments, the listing may be displayed to the user in a separate content window 700, as shown in FIG. 7. The separate content window 700 may be generated using hyper-text mark-up language (HTML) commands, JAVASCRIPT commands, or the like. The separate content window 700 may include one or more categories (i.e. background art, holiday-themed formats, humor, animations, and business-formatted content) and subcategories (i.e. animal images, nature images, and the like) of available content. Thumbnail images of the content may be displayed in the content window 700. There may also be commands available that allow a user to select particular content as default content for a future electronic message. As mentioned previously, since the content window 700 may contain links to pages of content available on content server 102, and since the data files containing the content may reside exclusively on the content server 102, the content server 102 may update its own pages of content without having to further reconfigure the native programming code of the existing message program or the installed plug-in code. In addition, the amount of stored content is, thus only limited to the available memory space in content server 102, rather than the typically more limited amount of memory space in a user terminal 104. Alternatively, users may store available content locally on their user terminal 104 or may even upload additional content to the content server 102 for later access by the user and/or additional users.

The content window 700 may also include hypertext links to additional content or tabs corresponding to further listings of available content. An example of the results of a selection by a user of one of the hypertext links or tabs in content window 700 is displayed in FIG. 8, wherein further selections of content may be provided.

It should be noted that, with respect to step 308, the virtual button 602 may be selected from the main window 400 or the electronic message window 500. In the former case, the selection of the virtual button 602 from the main window 400 may initiate the opening of a new electronic message window 500 and the content window 700 corresponding to the selected virtual button 602, as shown in FIG. 9.

Figure 10:
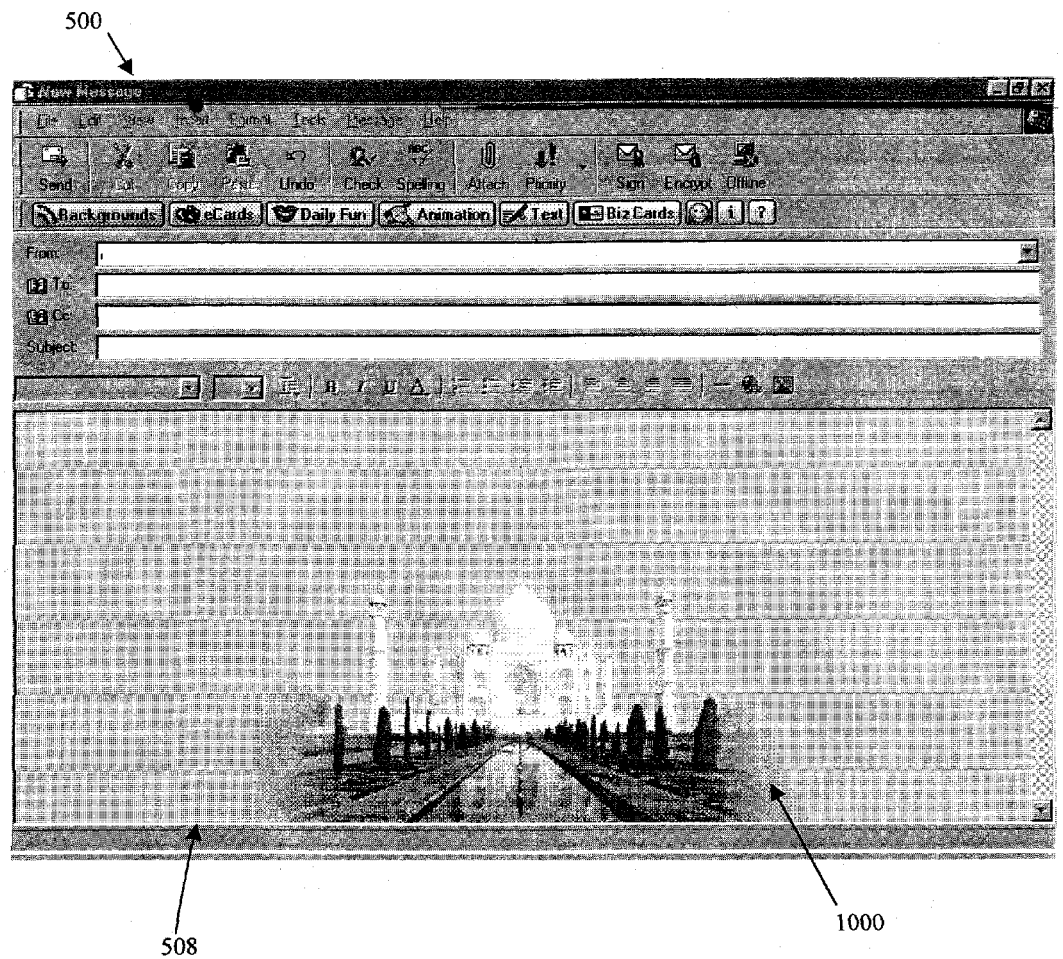
FIG. 10 is an illustration of a message window of an electronic message program including exemplary content selected from the virtual toolbar, according to certain embodiments of the present disclosure.
Figure 11:
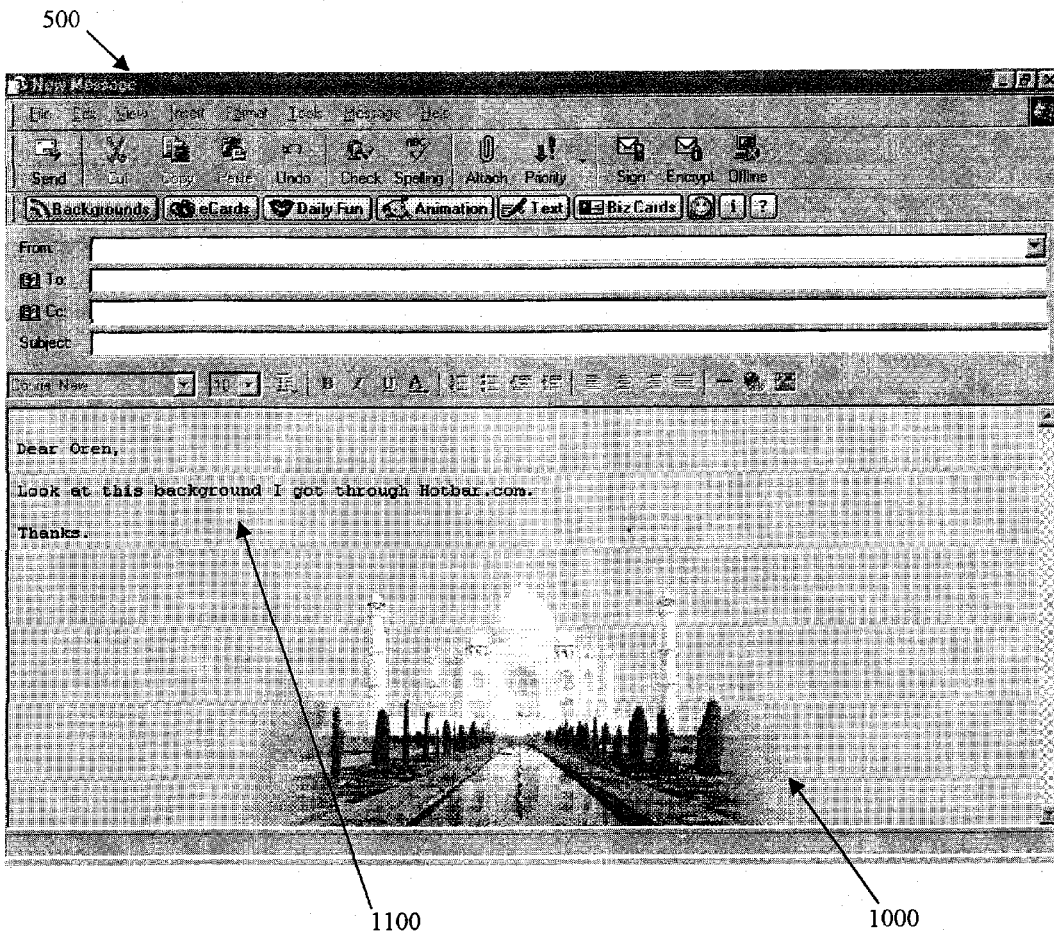
FIG. 11 is an illustration of a message window of an electronic message program including exemplary inputted text over the content selected from the virtual toolbar, according to certain embodiments of the present invention.

Returning again to process 300, after the content window 700 is displayed to the user, the user may select desired content for an electronic message from the displayed listing (step 310). The user may also select particular content as default content, if desired from the content window 700. Upon the selection of any type of content, the installed plug-in retrieves the selected content from the corresponding network address on the content server 102, and further inserts the selected content into the electronic message 500 for display to the user (step 312). One example of the results of this step 312 is shown in FIG. 10, wherein selected content 1000 is displayed to the user in the message input field 508 of the electronic message window 500. The user may then input desired text 1100, using a keyboard or the like, into the message input field 508 which may be displayed in conjunction with the selected content 1000, as shown in FIG. 11.

The manner in which retrieval and display of the selected content 1000 is accomplished is dependent upon the type of existing electronic message program in use. Reference is now made to an IHTMLDomDocument (or inspector HTML) interface published by Microsoft®, which is necessary for its electronic message programs to read and edit HTML-based content and is utilized in accordance with various embodiments of the present disclosure.

Where the electronic message program maintained by a user is Outlook®, the plug-in code described herein may retrieve a current active Inspector (or mail window) object in accordance with the above-mentioned published interface. This object has an established function called GetDocument, which provides the necessary inspector HTML Dom Document. Where the electronic message program is Outlook Express®, the installed plug-in code retrieves HTML content by providing appropriate processing instructions via a document container, in accordance with the accessibility software module provided for that program. In either case, the retrieved HTML content may provide both the accessible content and the virtual tool bar 600 of the present disclosure within the user's electronic message program.

Insertion of the selected content 1000 into an electronic message is accomplished using a mail editing module that is commonly provided to Outlook® and Outlook Express®. The IHTMLDomDocument interface enables the installed plug-in code to construct the HTML content within the message input field 508. The user may add desired text 1100 in any standard manner, in accordance with the native processing instructions provided by the electronic message program.

Finally, returning to process 300, the user may transmit the electronic message to a second user on a second user terminal 104 (step 314), after which the process 300 ends. Since some data files of content may be large in size, it may be desirable, in certain embodiments, to limit the size of the message transmitted in step 314. This can be accomplished, in various embodiments, by transmitting an embedded call to the selected content on the content server 102, rather than including the data file of the content itself. Upon opening the electronic message, the second user may open the received message, after which the embedded call is activated, and the selected content 1000 is uploaded for display to the selected user, along with any desired text 1100 in the received electronic message. Since the call is embedded in the electronic message by the user on the first user terminal 104, it should be readily appreciated the second user need not install the plug-in code 208 to view the content in the received message. It should also be readily appreciated that once a user installs the plug-in code 208, it is not necessary to re-install the plug-in code 208 for each successive electronic message generated. That is, steps 302 and 304 may be omitted when content is to be inserted in future electronic messages after the plug-in installation has been completed.

In various embodiments of the present disclosure, a content provider operating content server 102 may be able to raise revenue from a group of users using the processes described above. The revenue may be generated via advertising presented to the user during any of the steps of process 300. A plethora of methods for accomplishing the presentation of advertising is well known in the context of public computer networks, all of which are contemplated to be within the scope of the present disclosure. In addition, advertising revenue can be had by providing additional plug-ins to other types of computer programs, such as web browsers, along with the plug-in for the electronic message program described above. Advertising may then be displayed upon use of such other plug-ins by the user. Such additional program plug-ins are described in co-pending U.S. patent application Ser. No. 09/864,551 entitled SYSTEM AND METHOD FOR THE DYNAMIC IMPROVEMENT OF INTERNET BROWSER NAVIGABILITY filed in the name of Dobronsky et al. on May 23, 2001 which is a continuation in part of co-pending U.S. patent application Ser. No. 09/373,815 entitled SYSTEM AND METHOD FOR THE DYNAMIC IMPROVEMENT OF INTERNET BROWSER APPEARANCE AND CONNECTIVITY filed in the name of Dobronsky et al. on Aug. 13, 1999, each of which are incorporated herein by reference. In addition to, or in conjunction with advertising, a content provider may also generate revenue by charging subscription fees to users wishing to access the content.

Figure 12:
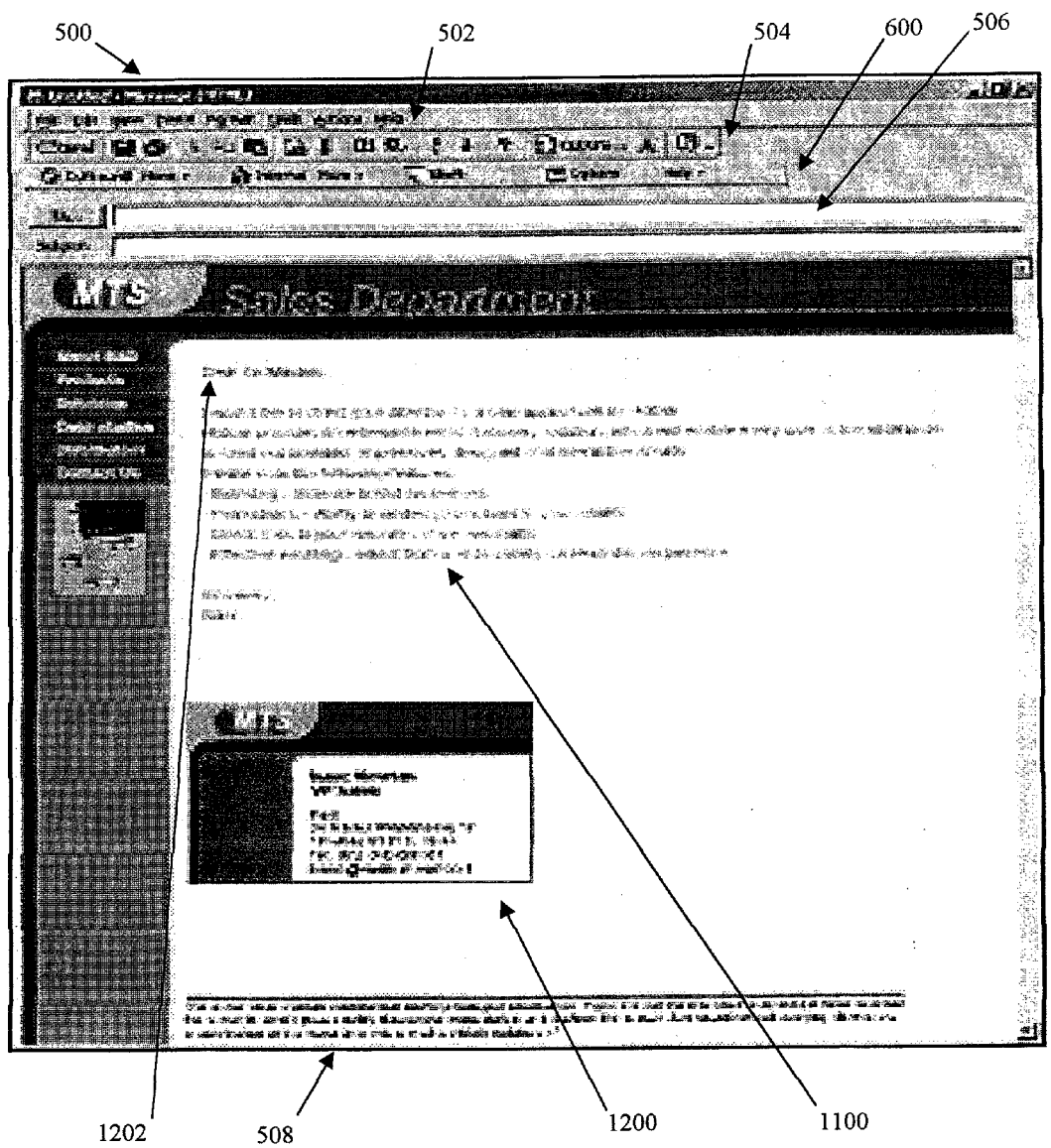
FIG. 12 is an illustration of a message window of an electronic message program including customized business content selected from the virtual toolbar, according to certain embodiments of the present disclosure.

Revenue may also be generated by providing design services to users for generating customized content that is accessible to a particular user or group of users paying for such services. For example, one contemplated feature of the present disclosure is providing business-formatted content for insertion into an electronic message. General business-formatted content can be provided to all users. However, customized business message formats and associated designs may be developed by the content provider specifically for a single business entity, in exchange for a fee. Installation and updating of customized message formats may be accomplished in a similar manner to those described above, or in any other useful manner. The developed content may include corporate logos, trademarks, company information, general corporate contact information, stationary designs, business card designs for particular employees and agents of the business entity, promotional materials, advertising and particular formats for internal and external electronic messages, including pre-formatted locations for desired text 1100 inputted by the business entity or its agents. An example of customized business-formatted content is shown in FIG. 12, including custom developed content 1200, pre-formatted text 1202 and pre-formatted location for inserting desired text 1100.

In other additional embodiments of the present disclosure, the installed plug-in code may further include processing instructions allowing for the attributes of the virtual toolbar 600 and virtual buttons 602 to be changed by accessing new formats and attributes automatically from the content server 102 whenever a user's reconfigured electronic message program is initiated. In this manner, it is not necessary for a user to perform any steps to receive updates to the installed plug-in code. In a particular embodiment, no user action is required in order for them to receive updates to either accessible content or the virtual menu bar including the virtual buttons. For example, where a virtual button is identified as having content associated with an upcoming holiday, once that holiday passes and a new holiday is approaching, the content server 102 may automatically access and change the name of the button when the electronic message program is open. The web page of associated content maintained by the content server may likewise be updated to include different content dedicated to the upcoming holiday without user interaction.

Nothing described herein or shown in the figures should be construed to limit the scope and attributes of content available for insertion into electronic messages via the processes described herein. Although the invention has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A method for customizing electronic mail messages by a computing device, comprising:
   providing a plug-in to a desktop electronic mail message program; and
   executing programming instructions from the plug-in to generate a virtual toolbar, independent of a native toolbar of the electronic mail message program, for display within the electronic mail message program, the virtual toolbar including at least one virtual button for selecting content including graphics for inclusion in an electronic mail message, at least a portion of the content being downloadable from a remote server, and the at least one virtual button being associated with at least one item or one category of available content, wherein the virtual tool bar has at least five or more virtual buttons, where a title on the virtual button is changeable from time to time by a content server in communication with the device with the resident electronic mail message program without initiation of any commands by the user the device, and where upon selection of a first virtual button, the installed plug-in retrieves a listing of content associated with the selected first virtual button from the content server and displays the available selections to the user of the device, and the displayed listing of content is retrievable by the installed plug-in when selected by the user of the device.

2. The method of claim 1, the executing program instructions further comprising:
   providing at least one automatically executable instruction with the plug-in for associating the plug-in with the electronic mail message program.

3. The method of claim 2, the at least one automatically executable instruction for inserting a programming call by the electronic mail message program for the virtual toolbar from the plug-in.

4. The method of claim 1, the at least one virtual button for implementing a programming instruction for displaying the content.

5. The method of claim 1, the business-formatted content comprising at least one of content and formatting for internal electronic mail messages of a business entity; and content and formatting for external electronic mail messages of a business entity.

6. The method of claim 1, wherein the electronic mail message program and the plug-in are developed by separate manufacturers.

7. The method of claim 1, further comprising updating the content available to a plurality of users without updating the plug-in or the electronic mail message programs stored by the plurality of users.

8. The method of claim 1, further comprising:
   receiving a selection of a virtual button from a user terminal; and
   transmitting a plurality of a first set of selectable content associated with the virtual button for display to the user.

9. The method of claim 1, further comprising:
   transmitting at least one advertisement for display to the user after the executing.

10. A non-transitory computer-readable medium encoded with processing instructions for implementing a method, performed by a computer, for customizing electronic messages, the method comprising:
    providing a plug-in to a desktop electronic mail message program;
    executing programming instructions from the plug-in to generate a virtual toolbar, independent of a native toolbar of the electronic mail message program, for display within the electronic mail message program, the virtual toolbar including at least one virtual button for selecting content including graphics for inclusion in an electronic mail message, at least a portion of the content being downloadable from a remote server, and the at least one virtual button being associated with at least one item or category of available content, wherein the virtual tool bar has at least five or more virtual buttons, where a title on the virtual button is changeable from time to time by a content server in communication with the device with the resident electronic mail message program without initiation of any commands by the user the device, and where upon selection of a first virtual button, the installed plug-in retrieves a listing of content associated with the selected first virtual button from the content server and displays the available selections to the user of the device, and the displayed listing of content is retrievable by the installed plug-in when selected by the user of the device.

11. A computer-implementable method for allowing customization of electronic mail messages, comprising:
    receiving executable programming code for including a virtual toolbar in an electronic mail message program of a user terminal, the executable programming code for displaying the virtual toolbar within a window of the electronic mail message program, separate from a native toolbar; and
    receiving, from a user, a selection of a virtual button of the virtual toolbar, the selected virtual button associated with selectable content including graphics for inclusion in an electronic message generated by the user from the electronic message program, at least a portion of the content being downloadable from a remote server, and the at least one virtual button being associated with at least one item or category of available content, wherein the virtual tool bar has at least five or more virtual buttons, where a title on the virtual button is changeable from time to time by a content server in communication with the device with the resident electronic mail message program without initiation of any commands by the user the device, and where upon selection of a first virtual button, the installed plug-in retrieves a listing of content associated with the selected first virtual button from the content server and displays the available selections to the user of the device, and the displayed listing of content is retrievable by the installed plug-in when selected by the user of the device.

12. The method of claim 11, wherein the selectable content is displayed in a separate window to a user.

13. The method of claim 11, further comprising:
    receiving a selection of one of the selectable content from the user; and
    transmitting the selected content for display to the user in a message input field of an electronic mail message.

14. The method of claim 13, further comprising:
embedding a call to the content in the electronic mail message for transmission to a second user, whereby when the second user opens the electronic mail message, the content is retrieved from the content server and displayed in the electronic mail message to the second user.

15. The method of claim 11, the selectable content including one of the following for association with an electronic mail message: holiday-themed content, visual images, animations, audio content, audio/visual content, and business-formatted content.

16. The method of claim 15, wherein the visual images include a plurality of animations.

* * * * *